United States Patent [19]

Klotmann et al.

[11] Patent Number: 4,511,266
[45] Date of Patent: Apr. 16, 1985

[54] ARRANGEMENT FOR MOUNTING A BEARING RING ON A ROTARY CYLINDER

[75] Inventors: Fred Klotmann, Cologne; Ralf Filges, Bergisch Gladbach, both of Fed. Rep. of Germany

[73] Assignee: Klöckner-Humboldt-Deutz AG, Fed. Rep. of Germany

[21] Appl. No.: 498,585

[22] Filed: May 26, 1983

[30] Foreign Application Priority Data

Jun. 25, 1982 [DE] Fed. Rep. of Germany ....... 3223773

[51] Int. Cl.$^3$ .................. F16C 13/00; F26B 11/04; F27B 7/22
[52] U.S. Cl. .................................. 384/441; 34/121; 384/549; 432/103
[58] Field of Search .............. 308/204, 203; 384/428, 384/441; 432/103; 34/108, 121, 133, 139

[56] References Cited

U.S. PATENT DOCUMENTS

| 3,384,356 | 5/1968 | Durinck | 308/204 X |
| 3,840,336 | 10/1974 | Brachthauser | 308/204 X |
| 3,860,303 | 1/1975 | Deussner | 308/204 |
| 3,953,087 | 4/1976 | Wurr et al. | 34/121 X |
| 4,320,586 | 3/1982 | Korting | 432/103 X |

FOREIGN PATENT DOCUMENTS 2415745 9/1979 France ....................... 384/428

*Primary Examiner*—John M. Jillions
*Assistant Examiner*—Thomas R. Hannon
*Attorney, Agent, or Firm*—Hill, Van Santen, Steadman & Simpson

[57] ABSTRACT

A rotary kiln construction of the type where a cylindrical kiln is supported for rotation on an annular bearing ring wherein the ring has an inner circumference larger than the outer circumference of the kiln cylinder and a plurality of spacing plates are arranged around the circumference of the cylinder to support the bearing ring concentrically with the cylinder, supporting assemblies for the spacing plates including a support element welded on the cylinder with abutment strips preventing axial displacement of the bearing ring and angle lugs preventing axial displacement of the spacing plates with the support assemblies located axially opposite each other so as to hold the plates between them and permit withdrawal of the plates from either axial direction.

4 Claims, 2 Drawing Figures

ARRANGEMENT FOR MOUNTING A BEARING RING ON A ROTARY CYLINDER

BACKGROUND OF THE INVENTION

The invention relates to improvements in rotary cylinders for kilns, and more particularly, to an improved structure for mounting an annular bearing ring on a rotary cylinder of a kiln.

In copending application, Ser. No. 461,167, filed Jan. 26, 1983, a structure for mounting an annular bearing ring is shown and described, and the present arrangement is an improvement thereon utilizing features taught by that application, but providing certain additional advantages. In a rotary kiln construction of the type shown in the application referred to, an annular bearing ring surrounds the kiln and is concentrically supported thereon with a plurality of spaced lining shims or spacing plates positioned around the cylinder circumference. These spacing plates are circumferentially spaced from each other and primarily accommodate thermal expansion and contraction of the bearing ring and of the related parts. Support structures are secured to the cylinder at circumferentially spaced locations on both axial sides of the bearing ring, and these support structures perform the function of axially supporting the bearing ring, and supporting and maintaining the plates in their fixed axial and circumferential location. They must also function to permit removal and replacement of the plates from time to time and permit removal and repair or replacement of the bearing ring.

In the German patent application OS No. 2 853 435, an arrangement for the mounting of a bearing ring on a rotary cylinder is shown wherein the spacing plates which are disposed between the bearing ring and the outer surface of the rotary cylinder are retained in an axial direction on one axial side with movement arresting elements also secured on the rotary cylinder and the spacing plates. The end of the spacing plate on the other side, however, is not supported or protected in a radial direction so that during operation of the rotary cylinder, the spacing plate has movement in a radial direction and is rapidly damaged and destroyed. Despite various ways of supporting the plates, they all have been found to be wanting and do not supply the requirements of a rotary bearing cylinder.

Accordingly, an object of the present invention resides in providing an improved arrangement for mounting a bearing ring on the housing or outer surface of a rotary cylinder for a rotary kiln wherein the circumferentially separated spacing plates are secured so that movement in an axial as well as a radial direction is prevented.

A further object of the invention is to provide an improved support for a bearing ring utilizing spacing plates held circumferentially and axially with a construction which permits the spacing plates to be removed and replaced in either axial direction relative to the cylinder.

A feature of the invention is to achieve the above objectives by providing support assemblies for the spacing plates such that when viewed in a circumferential direction of the rotary cylinder, the spacing plates are located between them and they provide circumferential support. The spacing plates are removed axially from between the support assemblies. The support assemblies are constructed so that they support or brace the spacing plate axially in a manner so that the spacing plates can be removed and replaced when needed. A particular advantage of the structure is that the arrangement of the support and abutment elements on both sides of the bearing ring accommodates simple rectangularly designed spacing plates without any recesses, and these are employed between the bearing ring and casing of the rotary cylinder.

Other objects, advantages and features will become more apparent with the teaching of the principles of the invention in connection with the disclosure of the preferred embodiment thereof in the specification, claims and drawings, in which:

DESCRIPTION OF THE PREFERRED EMBODIMENT

Figure 1:
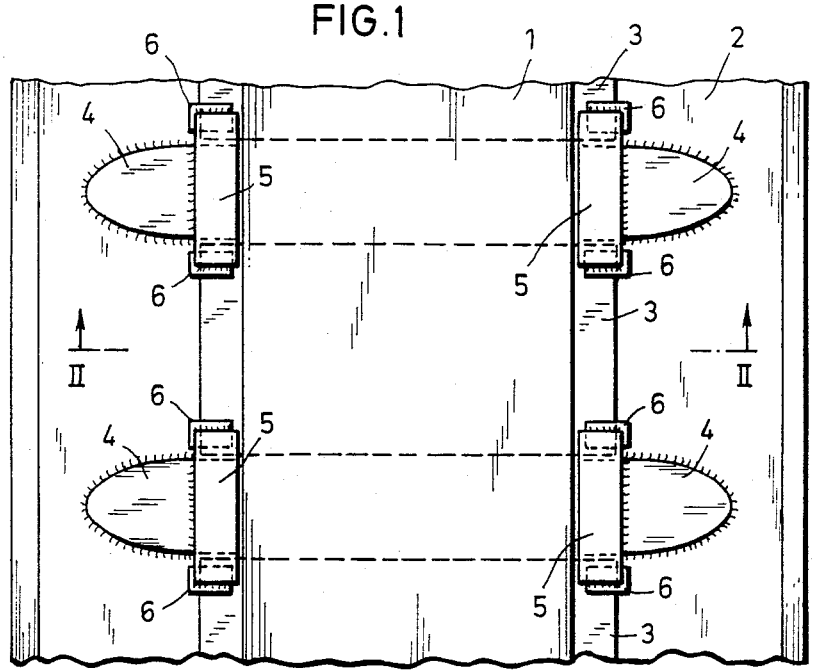
FIG. 1 is a fragmentary plan view of a portion of the outside of a rotary cylinder of a kiln.
Figure 2:
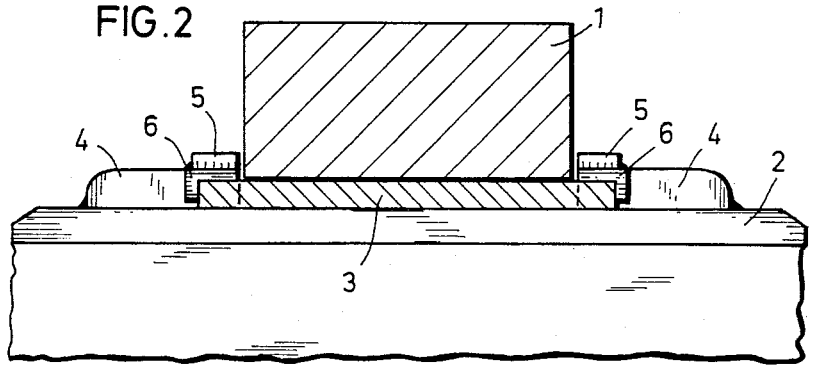
FIG. 2 is a vertical sectional view taken substantially along line II—II of FIG. 1.

As illustrated in FIGS. 1 and 2, a rotary cylinder of a kiln is provided which has a cylinder casing or collar 2 thereon for locating and carrying a bearing ring 1. The bearing ring has an inner circumference which is larger than the outer circumference of the cylinder and its mounting collar and the bearing ring is supported by rectangular shaped spacing plates 3. This permits full concentric support of the bearing ring and accommodates the relative thermal expansions and contractions which occur with the heating which accompanies the operation of a rotary kiln. The spacing plates support the bearing ring concentrically, but are essentially loosely arranged and are circumferentially spaced from each other.

On both sides of the bearing ring are support assemblies which include support elements 4 that are arranged axially opposite each other, as shown in FIG. 1. The support elements are welded to the outer surface of the mounting collar 2, and primarily function to provide a reliable support mounting for the bearing ring in its position so that it can support the cylinder during rotation.

The rectangularly designed spacing plates are positioned circumferentially between the support elements 4 so that they are held in their circumferentially spaced relationship. Because they are located between the support elements, they can be withdrawn and replaced in an axial direction and because the support elements are axially opposite each other and the plates are therebetween, the plates can be withdrawn and replaced in either axial direction. Withdrawal and reinsertion can be accomplished by sliding the plate axially from either side of the bearing ring.

On the support elements, and as part of the support assembly are welded abutment strips 5 which have an inner surface engaging and supporting the bearing ring. A slight spacing is permitted between the abutment strips and the sides of the bearing ring to allow for thermal expansion. The abutment strips are of a length so that they project circumferentially beyond the sides of the support elements 4. This construction permits supporting the spacing plates from above. For radial support of the spacing plates, and for holding them against axial displacement, angle lugs 6 are welded at each end of the abutment strips. The angle lugs have a downwardly extending leg which abuts the end of the plates so that they cannot be displaced axially. When the plates are to be removed, the angle lugs must be unwelded from the ends of the abutment strips which permits sliding the plates out in an axial direction. Similarly, when the bearing ring is to be removed in either direction, the support elements are removed or unwelded from the mounting collar so that the bearing ring can be slid axially off of the kiln cylinder. In some constructions, the support elements may be of thinner design so that the mere removal of the abutment strips will allow the bearing ring to be slid axially over the tops of the support elements.

The support elements and the support assemblies are located opposite each other in an axial direction with the spacing plates 3 therebetween. This permits removal of the spacing plates without having to remove the support elements and the spacing plates can be slid out in either direction. The weldments between the support elements 4 and the abutment strips are located axially outwardly from the bearing ring so that welding and unwelding can occur without directing the heat close to the bearing ring. Further as will be observed, mere removal of the weld which holds the abutment strip on, will permit removal of the abutment strip and the angle lugs at each end will be removed with the abutment strips. Thus, in operation when the spacing plates 3 are to be removed, the weldment between the abutment strips 5 and the support elements 4 is merely removed such as by being ground off or heat softened, and removal of the abutment strip will permit the plate to be slid out axially from between the support elements. The plate can then be repaired or replaced and slid back into place with the abutment strips rewelded in place as shown.

Thus, it will be seen that we have provided an improved kiln and bearing ring construction which achieves the objectives and advantages above set forth, and provides a more reliable stable operating construction for a kiln and avoids disadvantages possessed by the art.

We claim as our invention:

1. A rotary kiln construction comprising in combination:
   a rotary kiln cylinder having a cylindrical outer surface;
   an annular bearing ring for supporting the kiln in rotation and having an inner circumference larger than the outer circumference of the cylinder;
   a plurality of spacing plates located between the ring and cylinder and circumferentially spaced from each other;
   and supporting assemblies at each axial side of the bearing ring including a support element welded to the outer surface of the cylinder, abutment strips mounted thereon axially engaging the sides of the bearing ring preventing axial displacement thereof, and
   angle lugs mounted on the ends of the abutment strips and having a portion axially engaging said spacing plates preventing axial displacement thereof.

2. A rotary kiln construction constructed in accordance with claim 1:
   wherein the spacing plates are rectangular in shape.

3. A rotary kiln construction constructed in accordance with claim 1:
   wherein the oppositely located supporting assemblies are of identical construction at each side of the bearing ring.

4. A rotary kiln construction comprising in combination:
   a rotary kiln cylinder having a cylindrical outer surface;
   a mounting collar on the outer surface of the cylinder;
   an annular bearing ring for supporting the kiln in rotation and having an inner circumference larger than the outer circumference of the mounting collar;
   a plurality of rectangular shaped spacing plates located between the bearing ring and mounting collar holding the bearing ring concentric with the cylinder with the plates circumferentially spaced from each other;
   and supporting assemblies at each axial side of the bearing ring including a support element welded to the outer surface of the mounting collar, a circumferentially extending abutment strip weldably mounted on the support elements and providing axial support against each side of the bearing ring, and angle lugs mounted beneath each end of the abutment strips having a portion extending radially inwardly against the end of each of the plates to prevent axial displacement thereof with the plates located between the support elements which hold the plates against circumferential displacement.

* * * * *